United States Patent

[11] 3,609,221

[72] Inventor Erich Langer
Maria-Enzersdorf, Austria

[21] Appl. No. 840,250
[22] Filed July 9, 1969
[45] Patented Sept. 28, 1971
[73] Assignee U.S. Philips Corporation
New York, N.Y.
[32] Priority July 11, 1968
[33] Austria
[31] A6701/68

[54] VIDEO SIGNAL IDENTIFICATION CIRCUIT
7 Claims, 4 Drawing Figs.

[52] U.S. Cl. .......... 178/7.3 R, 178/58 R, 178/6 R, 325/392
[51] Int. Cl. .......... H04n 1/38
[50] Field of Search .......... 178/6 T, 5.8, 7.3; 325/392, 393, 362

[56] References Cited

UNITED STATES PATENTS

| | | | |
|---|---|---|---|
| 2,923,862 | 2/1960 | Teich | 325/362 |
| 3,337,805 | 8/1967 | Joseph | 325/393 |
| 3,378,775 | 4/1968 | Joseph | 325/393 |

*Primary Examiner*—Robert L. Griffin
*Assistant Examiner*—Richard P. Lange
*Attorney*—Frank R. Trifari

ABSTRACT: A video signal identification circuit provides a control signal to indicate the absence of either line or field pulse synchronizing signals within a video signal. The line and field pulse groups are separated from the input video signal and selected portions of the field pulse group are suppressed. The remaining line and field pulses are then used as a input to a monostable sawtooth generator which has a natural period exceeding a line period. The output of the sawtooth generator provides an input to a threshold circuit which outputs the control signal in response to the predetermined input signal.

INVENTOR.

ERICH LANGER

BY

AGENT

INVENTOR.

ERICH LANGER

BY

AGENT

VIDEO SIGNAL IDENTIFICATION CIRCUIT

The invention relates to a video signal identification circuit for providing, dependent on the occurrence of synchronizing pulses in a video signal, a control magnitude for a switching device by which a function of a television device can be switched on or off. Such an identification circuit is known and serves to cut off separate stages of a television receiver when no video signal or an unsuitable video signals is received. Interferences cannot then be heard through the audio section of the device, or unwanted signals cannot come in the video section of the device. Such interferences may occur when a very weak video signal or no video signal at all, but only a noise signal is present, or when the video signal is distorted, for example, as a result of erroneous tuning of the receiver such that the synchronizing pulses are mutilated. However, video signals in which no synchronizing pulses at all or only a part thereof are present may alternatively occur. It has already been proposed as a criterion for identifying a video signal to use the presence of synchronizing pulses, particularly of field synchronizing pulses in the video signal.

An object of the invention is to provide a video signal identification circuit, which operates extremely accurately and provides a stringent criterion for the presence of a complete video signal so that it is also suitable for use in professional television devices such a as television transmitter, etc.

To this end a video signal identification circuit according to the invention is characterized in that is it comprises a monostable sawtooth generator which has a natural period exceeding one line period and which includes an input for applying a signal comprising synchronizing pulses separated from the video signal to be identified, wherein at least the rearmost portion of the field-synchronizing pulses is suppressed, said sawtooth generator including an output coupled to an input of a threshold circuit, said video signal identification circuit furthermore comprising a control circuit an input of which is coupled to the sawtooth generator, the maximum excitability of the sawtooth generator and the threshold value of the threshold circuit being adjustable relative to each other with the aid of said control circuit dependent on the frequency of the signal to be applied to the input of the sawtooth generator.

Due to these steps it is achieved that the criterion to be established for a complete video signal is dependent on the fact whether both the line pulses and the field pulses are present in the video signal. If there is none or only one of the two kinds of pulses present, the function of the television device is switched off.

In a preferred embodiment of the identification circuit according to the invention the sawtooth generator is of a type having a signal dependent charge voltage. In this case, the part of the sawtooth generator circuit providing the signal dependent charge voltage acts as a control circuit adapting automatically the maximum excitability of the sawtooth generator, that means the maximum obtainable amplitude of its output signal, to the frequency of its input signal.

An advantageous further embodiment of the circuit arrangement according to the invention is characterized in that it includes a feedback circuit one input of which is coupled to an output of the sawtooth generator and one output of which is connected to an input of the sawtooth generator or of the threshold circuit, so that the difference between the response threshold of the threshold circuit and the mean value of the output signal of the sawtooth generator is reduced during at least part of half the period of the field pulses so as to cause the threshold circuit to respond earlier, the peak values of the output signal of the sawtooth generator always remaining below the threshold value upon the occurrence of line pulses only.

As a result it is achieved that the identification circuit can also distinguish arbitrary noise signals from complete video signals. The reduction of the absolute value between the response threshold of the threshold circuit and the mean value of the output signal of the sawtooth generator may be obtained by shifting the mean value of the output signal relative to the response threshold or by shifting the response threshold relative to the mean value of the output signal which may be carried out, for example, by means of a relay which responds to the pulses from the threshold circuit and then causes one of the two above-mentioned values to be changed over during at least part of half the period of time of the field pulses. In this connection it has been found to be advantageous when the pulses from the threshold circuit are applied to a monostable multivibrator which has a natural period in the order of half a period of the field pulses and which can be brought to the initail position of its metastable condition by each incoming pulse, the signal for controlling the switching device being derived from said multivibrator on the one hand, and the feedback circuit being connected to the multivibrator on the other hand.

A particularly simple and efficient circuit arrangement is obtained when a sawtooth generator of the type having a signal-dependent charge voltage is used in which the direct voltage component of the charge voltage is derived from a potential divider to which the output of the feedback circuit is connected so as to influence this direct voltage component.

In order that the invention may be readily carried into effect, a few embodiments thereof will now be described in detail, by way of example, with reference to the accompanying diagrammatic drawings, in which FIG. 1 shows a simplified diagram of a first embodiment of a video signal identification circuit according to the invention, in which a generator having a signal-dependent charge voltage is used as a sawtooth generator.

Figure 1:
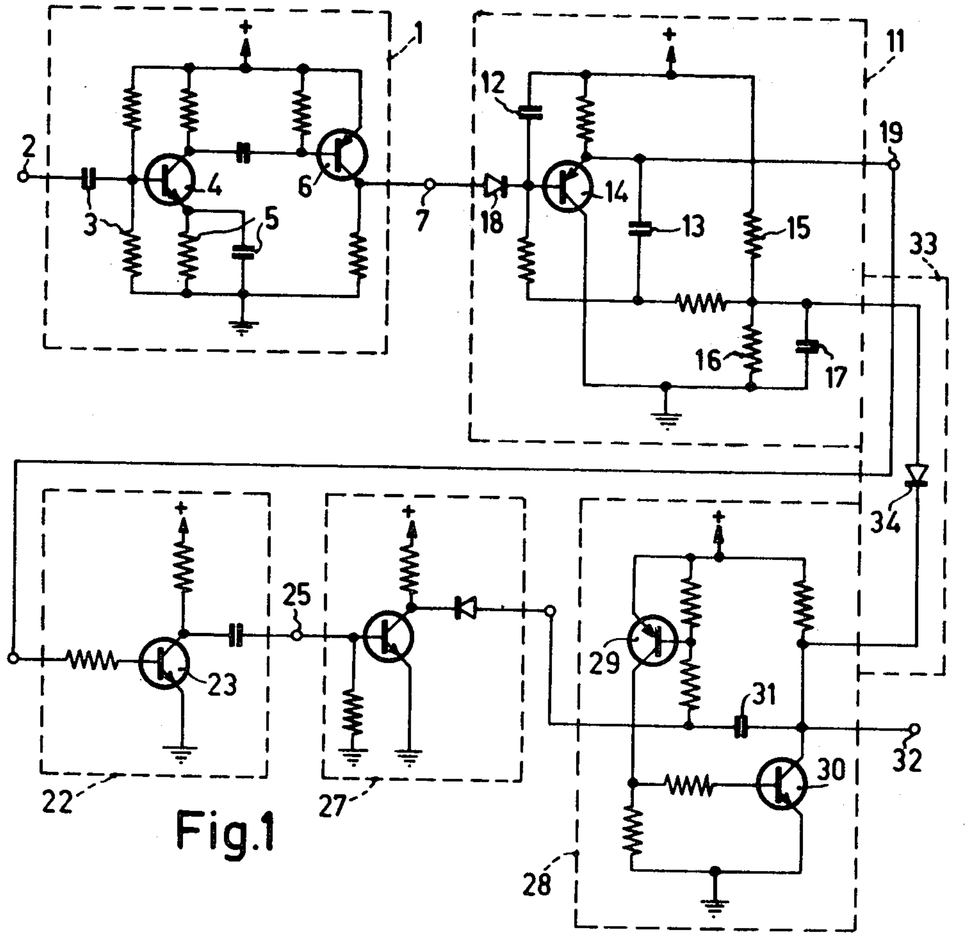
Figure 2:
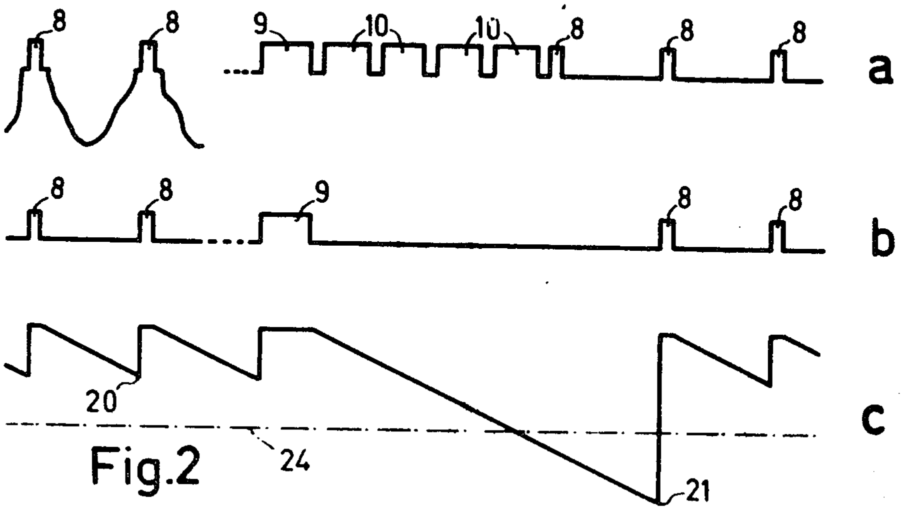
FIG. 2 shows the signal variation at three points in the circuit arrangement when a complete video signal is present to explain the operation of the embodiment of FIG. 1.

In FIG. 1 the reference numeral 1 denotes a stage of a television device to which stage the video signal diagrammatically shown in FIG. 2*a* is applied to the input terminal 2. This stage serves to separate the synchronizing pulses from the video signal, the final portion of the field pulses being suppressed every time. To this end the video signal is applied through a differentiating network 3 to a transistor 4 bottomed by the synchronizing pulses, the emitter circuit of which transistor includes an RC-element 5 which, due to its sharp, cuts off this transistor exactly during the occurrence of the field pulse. The pulses are formed by means of a transistor 6 in audio arrangement connected behind this transistor 4, so that the signal shown in FIG. 2*b* is present at the output 7 of this stage. This signal consists of the line pulses 8 and the first main field pulse 9. The next four main field pulses 10 and possibly a few line pulses are suppressed in this signal, so that the requirement of at least the rearmost portion of the field pulse being suppressed is satisfied which requirement is essential for the function of the circuit arrangement according to the invention.

The signal occurring at the terminal 7 of the stage 1 is applied to a sawtooth generator 11 which is of the monostable type and has a natural period which exceeds the line period, and in which a circuit arrangement known under the name of "sawtooth generator having a signal-dependent charge voltage" is used. In this circuit arrangement the charge capacitor of the sawtooth generator is indicated by the reference numeral 12, and the feedback capacitor is indicated by the reference numeral 13 which feeds back an alternating voltage from the emitter to the base of transistor 14 and produces the signal-dependent charge voltage. The direct voltage component of the charge voltage for the capacitor 12 is formed by the potential divider consisting of the resistors 15, 16, the resistor being shunted by a smoothing capacitor 17.

Each pulse applied through the blocking diode 18 to the sawtooth generator ensures that this sawtooth generator is brought to its metastable condition, the capacitor 12 being discharged. At the end of each such pulse the capacitor 12 starts to charge up to its charge voltage and this so long until it has reached its full-charge voltage, in which case the sawtooth generator is in its stable condition and the transistor 14 is in its fully bottomed condition, or until it is discharged again by the next pulse. As a result a sawtooth output signal appears at the output 19 of the sawtooth generator which has different peak values in accordance with the frequency at which the pulses occur. The feedback capacitor 13 ensures that the peak value of the output signal increases as the frequency at which the pulses occur increases. In fact, an alternating voltage component is superposed under the influence of the capacitor 13 on the direct voltage component of the charge voltage for the capacitor 12 determined by the potential divider 15, 16. The operation of this circuit arrangement is further described hereinafter with reference to three different composite video signals.

For the first case it is assumed that the video signal only includes field pulses and no line pulses. This means that the signal at the terminal 7 each time consists of one pulse for each field. The frequency at which the pulses applied to the sawtooth generator occur is so small in this case that the sawtooth generator is mainly in its stable condition, so that also the feedback due to the substantially uncharged capacitor 13 cannot take effect and the maximum peak value of the output signal upon the occurrence of a pulse is therefore very small namely approximately equal to the value determined by the potential divider 15, 16.

If it is assumed in the second case that the video signal only includes line pulses and no field pulses, the signal at the terminal 7 consists of a periodic series of pulses 8. The frequency at which these pulses occur is now so large that the sawtooth generator, as a result of its natural period which exceeds the line period, cannot reach its stable condition between two occurring pulses so that sawtooth pulses are produced in periodic succession. In this case a voltage superposition on the direct voltage component of the charge voltage. for the capacitor 12 occurs due to the action of the feedback of the capacitor 13 which is now charged up to a higher voltage value, all this in accordance with the principle of a sawtooth generator having a signal-dependent charge voltage. Since the sawtooth generator is, however, brought to its metastable condition after each line, the peak value of its output signal remains low.

Finally it is assumed that a complete video signal is present, that is to say, this signal comprises both line and field pulses in which case the signal shown in FIG. 2*b* appears at the terminal 7 as was already described. As a result of this signal the sawtooth generator will supply during each line, as described in the foregoing, an output signal having a low peak value as is shown by the reference numeral 20 in FIG. 2*c*. If a field pulse occurs, the sawtooth generator is first brought to its metastable condition by the pulse 9, whereafter no pulse is received anymore during the remaining part of the field pulse. During this comparatively long time interval the capacitor 12 is thus able to charge up to the charge voltage increase by the feedback so that now a sawtooth having a higher peak valve 21 occurs. Sawtooth having a lower peak value 20 are then again formed by the line pulses succeeding the field pulse. As is apparent from the foregoing, an output signal of the sawtooth generator having a maximum possible peak value (21) is always obtained when the field pulse occurs and only in the presence of a complete video signal, while in all other cases, when there is no complete video signal present, the peak value of the output signal is lower.

The output signal occurring at a terminal 19 of the sawtooth generator 11 connected to the emitter of the transistor 14 is applied to a threshold circuit 22 which consists of a transistor 23 bottomed in its rest position and which is cut off whenever only a maximum possible peak value occurs in the output signal of the sawtooth generator. The response threshold of the threshold circuit is indicated by a dot-and-dash line 24 in FIG. 2*c*. Thus a pulse occurs at the output 25 of the threshold circuit whenever the output signal of the sawtooth generator reaches its maximum possible peak value.

As a result a pulse series occurs only in the presence of a complete video signal at the output terminal 25 of the threshold circuit. These pulses then have a frequency which corresponds to the repetition frequency of the field pulses. Such a series of pulses is thus the criterion for a complete video signal. In case of an incomplete video signal, that is to say, when either of the two kinds of synchronizing pulses is not present, no pulses occur at the terminal 25 because then the output signal of the sawtooth generator never reaches the maximum possible peak value and thus does not respond to the threshold circuit. As a result the output signal of the threshold circuit may be used as a control magnitude for a switching device by which the function of a television device is always switched on when a complete video signal is present. In this manner it is prevented that unwanted interference occur in the television device, for example, in a television receiver due to an incomplete video signal being present. It is not essential to the present invention in what manner the characteristic pulse series occurring at the threshold circuit is used for operating the switching device; this may be effected, for example, by taking the mean value of the pulse series and by causing the switching device to respond through a gating circuit dependent on this value.

In the relevant embodiment the output signal of the threshold circuit 22 is applied to a control stage 27 inverting the pulse polarity for a monostable multivibrator 28. The monostable multivibrator whose transistors 29, 30 are cut off in their stable conditions has a natural period in the order of half a period of time between the field pulses and is brought to the initial position of its metastable condition by each incoming pulse, which is effected in the usual manner in that the incoming pulses directly influence the charge condition of its charge capacitor 31. Thus, again a series of pulses occurs at the output 32 of the multivibrator when a complete video signal is present and at a frequency corresponding to the frequency of the field pulses so that also a switching device can be controlled by the signal at the output 32.

Furthermore a feedback circuit 33 is provided which is connected between the collector of the transistor 30 of the monostable multivibrator through a blocking diode 34 and the potential divider 15, 16 of the sawtooth generator 11. In this manner the direct voltage component of the charge voltage of the capacitor 12 of the sawtooth generator 11 and hence the mean value of the output signal of the sawtooth generator can be influenced. This influence is exerted whenever the transistor 30 is bottomed and the resistor 16 substantially short-circuits as a result thereof, which is effected whenever the monostable multivibrator 28 is brought to its metastable condition by the pulse occurring at the threshold circuit 22. The mean value of the output signal is thus always shifted towards the respond threshold of the threshold circuit for the duration of the natural period of the monostable multivibrator 28 whenever the output signal of the sawtooth generator reaches the maximum possible peak value, but all this to such an extent that the peak values of the output signal always remain below the threshold values when the line pulses occur, so that the threshold circuit may sooner respond when the peak values of the output signal reach the corresponding value. The capacitor 17 connected in parallel with the resistor 16 then smoothes such that this variation of the mean value of the output signal of the sawtooth generator is substantially continuously maintained when a complete video signal is present.

These steps also ensure that a pulse series corresponding to the criterion for a complete video signal does not occur at the output 32 of the monostable multivibrator 28 when a noise signal instead of a video signal is present, so that the switching device does not switch on the television device. In fact, only the following two cases may occur when a noise signal is present. If in one case the noise signal consists of a pulse series having a low frequency, the peak values of the output signal of the sawtooth generator will not reach the response threshold of the threshold circuit. Pulses then do not occur at the output 32 of the monostable multivibrator 28. The other case occurs when the frequency of the pulses of the noise signal reaches a value such that the output signal of the sawtooth generator reaches the response threshold of the threshold circuit at a given instant. If this happens, the threshold circuit supplies a pulse which brings the monostable multivibrator 28 to its metastable condition so that the mean value of the output signal of the sawtooth generator is simultaneously shifted through the feedback circuit 33 towards the response threshold. This has the result that peak values which are smaller than the maximum possible ones in the output signal of the sawtooth generator now also reach the response threshold so that the threshold circuit again supplies pulses which bring the monostable multivibrator 28 every time to the initial position of its metastable condition. As a result the monostable multivibrator 28 remains continuously in its metastable condition and does not supply pulses while the feedback remains operative.

It is apparent from the above that the monostable multivibrator 48 is either continuously in its stable condition or continuously in its metastable condition when a noise signal is present. Of course, these two conditions may alternately occur upon frequency variations of the pulses in the noise signal, a pulse being supplied every time. However, on account of the static behavior of the noise signals such pulses will not have a frequency in accordance with the frequency of the field pulses as viewed at least over a given period so that the criterion for a complete video signal is not satisfied. The choice of the natural period of the monostable multivibrator 28 and of the extent of feedback makes it possible to determine from which frequency of the pulses of the noise signal the alternation in the above-mentioned condition occurs. A pulse series at a frequency corresponding to the repetition frequency of the field pulses occurs at the output 32 only when a complete video signal is present. As a result the switching device also switches on the television device only when a complete video signal is actually present. Such a circuit arrangement, an example of which has been given in this embodiment, is for example, especially suitable for switching on and switching off a transmitter of an unmanned television station.

Figure 3:
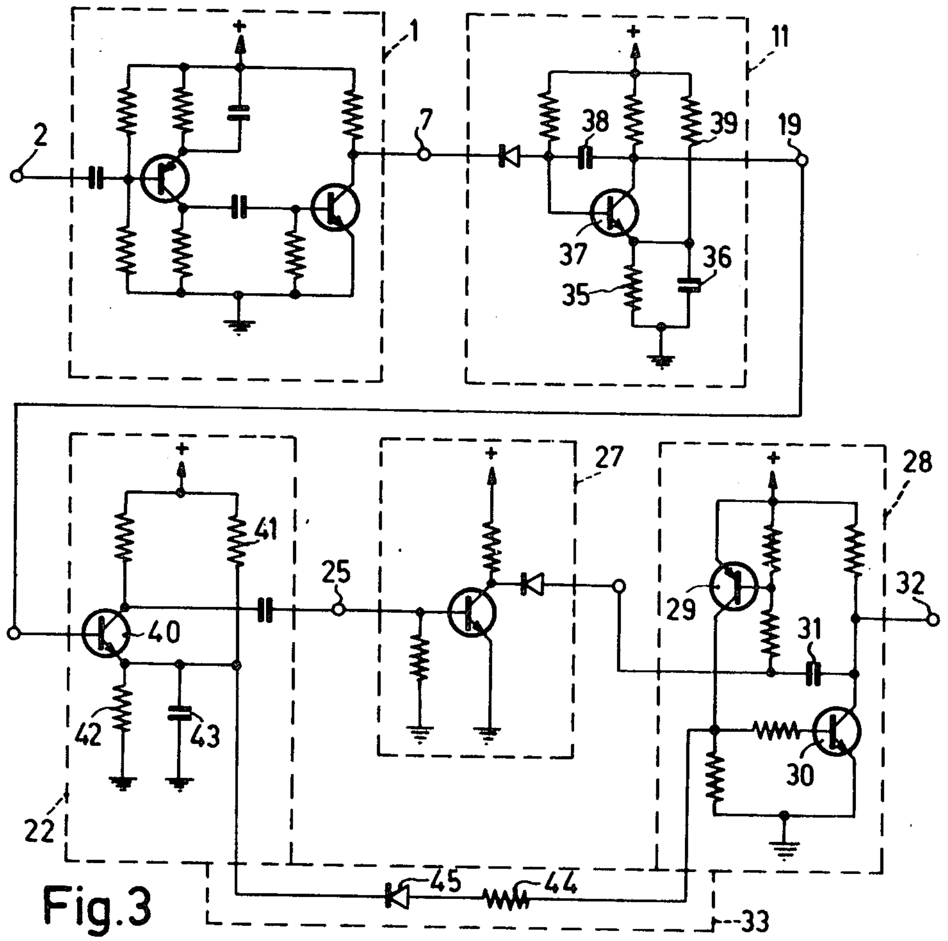
FIG. 3 shows a simplified diagram of a second embodiment of a video signal identification circuit according to the invention, employing a sawtooth generator having a Miller integrator circuit

In the embodiment of FIG. 3 reference numeral 1 again indicates the stage for separating the synchronizing pulses and for suppressing the field pulses during the final portion (FIG. 4*b*) of the video signal (FIG. 4*a*) and the reference numeral 11 indicates the monostable sawtooth generator which in this case is formed as a Miller integrator circuit. Essential for the desired identification action of this generator is the RC-element 35, 36 in the emitter circuit of the transistor 37 between the collector and the base of which the capacitor 38, which forms the Miller capacitance is connected. The resistor 35 together with a resistor 39 forms a potential divider. The capacitor 36 serves as a smoothing capacitor which will further be described hereinafter.

If only line pulses occur at the terminal 7, the sawtooth generator always supplies a sawtooth signal at the its output 19, which signal has a low peak value since the transistor between the line pulses has still not reached its stable condition at which the transistor 37 is fully bottomed. A voltage will be developed at the capacitor 36 which is approximately the same as the voltage division ratio between the resistors 35 and 39. The component which is the result of the sawtooth emitter current of transistor 37 is then only very small due to the low peak values of the sawtooth signal.

If only field pulses occur at the terminal 7, the sawtooth generator is brought to its metastable condition by each such pulse, but reaches its stable condition between two field pulses during a rather long time so that a trapeziumlike signal variation is produced. Since tin this case the sawtooth generator is in its stable condition during a rather long period, at which the transistor 37 is fully bottomed, the voltage at the capacitor 36 increases relative to the above-described case, with the result that the maximum possible peak valve of the output signal of the sawtooth generator is not reached.

Figure 4:
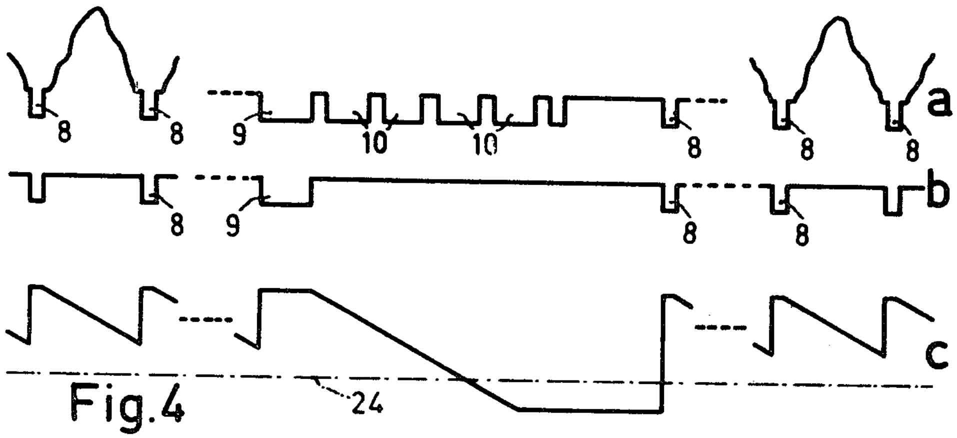
FIG. 4 shows the signal variation for the embodiment of FIG. 3.

In the presence of a complete video signal again a sawtooth output signal of the sawtooth generator occurs during the occurrence of the line pulses, the voltage at the capacitor 36, likewise as in the first-mentioned case, being substantially determined by the potential divider 35, 39. When the image pulse in the video signal occurs, the pulse 9 brings the sawtooth generator to its metastable condition during which the transistor 37 is cut off. Subsequently the transistor 37 increasingly becomes more conducting until it is finally completely bottomed, and hence the stable condition of the sawtooth generator has been reached, which is maintained until the next pulse 8 occurs. Unlike the situation in which a signal only includes field pulses, the stable condition of the sawtooth generator in the case of a complete video signal is only reached during a portion of the period of time of occurrence of the field pulse so that substantially the same voltage is adjusted at the capacitor 34 as in the case where only line pulses occur. As a result the transistor 37, when it is fully bottomed, draws a larger current and the maximum possible peak value is reached in the output signal of the sawtooth generator is shown in FIG. 4*c*.

The output signal of the sawtooth generator 11 is again applied to a threshold circuit 22 which comprises a transistor 40, which is bottomed in its rest condition, the emitter of which is biassed for forming the response threshold through the potential divider 41, 42. The resistor 42 is shunted by means of a smoothing capacitor 43. If the maximum possible peak value occurs in the output signal of the sawtooth generator, the transistor 40 is cut off for some time so that a pulse occurs at the output 25 of the threshold circuit 22, which pulse is again applied through a control stage 27 to a monostable multivibrator 28 having a natural period in the order of half the field pulse duration so that at the output 32 thereof, in the presence of a complete video signal, a series of pulses at a frequency corresponding to the repetition frequency of the field pulses can be derived which then serves as a control magnitude for the threshold circuit.

In this embodiment the feedback circuit 33 is connected between the collector of transistor 29 of the monostable multivibrator through a resistor 44 and a blocking diode 45 and the emitter of the transistor 40 of the threshold circuit 22 so that the response threshold relative to the mean value of the output signal of the voltage generator is reduced as soon as the monostable multivibrator is in its metastable condition. In fact, in this case the bottomed transistor 29 connects the resistor 44 in parallel with the resistor 41 of the potential divider 41, 42, determining the response threshold. The response threshold is again shown by a dot-and-dash line 24 in FIG. 4*c*.

The operation of this feedback circuit is analogous to that of the first embodiment. This circuit again provides the possibility of distinguishing between a noise signal and a complete video signal, pulses having a frequency corresponding to the repetition frequency of the field pulses occurring at the output of a monostable multivibrator only in the last-mentioned case.

Of course a larger number of variations of the above-mentioned embodiments is possible without passing beyond the scope of the present invention. This relates to, for example, the manner in which at least part of the field pulse of the synchronizing signal separated from the video signal is suppressed, and to the control of the ratio of the threshold value of the threshold circuit relative to the maximum reachable amplitude of the output signal of the sawtooth generator. In the last-mentioned case it is necessary that the circuit arrangement includes a device for deriving a control voltage from the instantaneous synchronizing pulse frequency, which control voltage either influences the maximum reachable amplitude of the sawtooth voltage (as was shown in the above-mentioned embodiment) or the threshold voltage of the threshold circuit or both at the same time. Those skilled in the art will readily be able to carry out a possible control of the threshold value.

I claim:

1. A video signal identification circuit for providing a first output signal when both line pulses and field pulses are present in a video signal and a second output signal when either line pulse or field pulses are absence from a video signal comprising, means to separate line pulse groups and field pulse groups from a video signal, means responsive to an initial field pulse for suppressing subsequent field pulses within a field pulse group a monostable sawtooth generator having a natural period exceeding one line period responsive to said line pulse group and the field pulses not suppressed, and a threshold circuit coupled to said generator for producing an output signal having a first value when said generator input exceeds a predetermined signal level and a second value for signal levels below said predetermined signal level.

2. The video signal identification circuit as claimed in claim 1 wherein said monostable sawtooth generator has a signal dependent charge voltage.

3. The video signal identification circuit as claimed in claim 1 further comprising a monostable multivibrator which has a natural period in the order of half the period of time between field pulse groups and means by which to connect said multivibrator to said threshold circuit.

4. The video signal identification circuit as claimed in claim 3 wherein said means by which to connect said multivibrator to said threshold circuit comprises a control stage adapted to invert output signals from said threshold circuit.

5. The video signal identification circuit as claimed in claim 3 further comprising means by which to feedback signals from said multivibrator to said monostable sawtooth generator whereby the mean value of the output from said generator is changed.

6. The video signal identification circuit as claimed in claim 5 wherein said means by which to feedback signals comprises a diode.

7. The video signal identification circuit as claimed in claim 5 wherein said monostable sawtooth generator comprises a signal dependent charge voltage.